(12) United States Patent
Togo et al.

(10) Patent No.: US 9,587,892 B2
(45) Date of Patent: Mar. 7, 2017

(54) HEAT EXCHANGER

(71) Applicant: SUMITOMO PRECISION PRODUCTS CO., LTD., Amagasaki-shi, Hyogo (JP)

(72) Inventors: Eiji Togo, Hyogo (JP); Takashi Eta, Hyogo (JP); Yasuhiro Fujita, Hyogo (JP)

(73) Assignee: SUMITOMO PRECISION PRODUCTS CO., LTD., Hyogo (JP)

( * ) Notice: Subject to any disclaimer, the term of this patent is extended or adjusted under 35 U.S.C. 154(b) by 138 days.

(21) Appl. No.: 14/655,683

(22) PCT Filed: Dec. 18, 2013

(86) PCT No.: PCT/JP2013/007443
§ 371 (c)(1),
(2) Date: Jun. 25, 2015

(87) PCT Pub. No.: WO2014/103253
PCT Pub. Date: Jul. 3, 2014

(65) Prior Publication Data
US 2015/0345876 A1    Dec. 3, 2015

(30) Foreign Application Priority Data
Dec. 26, 2012  (JP) .................... 2012-282754

(51) Int. Cl.
F28D 7/10   (2006.01)
F28F 9/02   (2006.01)
(Continued)

(52) U.S. Cl.
CPC ............ *F28F 9/0243* (2013.01); *B23K 31/02* (2013.01); *B23K 31/027* (2013.01);
(Continued)

(58) Field of Classification Search
CPC ........ F28F 9/0243; F28F 9/02; F28F 2275/06; B23K 31/02; B23K 31/027; B23K 33/004; B23K 2201/14; F28D 9/0062
(Continued)

(56) References Cited

U.S. PATENT DOCUMENTS 3,265,129 A * 8/1966 Bawabe ................ F28D 9/0062
165/166
4,150,720 A * 4/1979 Brackman ................ F24J 2/202
126/643
(Continued)

FOREIGN PATENT DOCUMENTS

DE   10 2008 014978 A1   9/2009
GB         1253250 A     11/1971
(Continued)

*Primary Examiner* — Justin Jonaitis
(74) *Attorney, Agent, or Firm* — Maschoff Brennan

(57) ABSTRACT

This heat exchanger includes a core and a header tank. The entire peripheral edge of an opening of the header tank welded to the core has a bevel inclined from the internal surface of the header tank toward the external surface thereof at a predetermined bevel angle. At least a portion of the peripheral edge of the opening of the header tank has a second inclined portion inclined from the external surface of the header tank toward the internal surface thereof at an angle larger than the predetermined bevel angle.

4 Claims, 4 Drawing Sheets

(51) Int. Cl.
  *B23K 31/02* (2006.01)
  *B23K 33/00* (2006.01)
  *F28D 9/00* (2006.01)
(52) U.S. Cl.
  CPC .............. *B23K 33/004* (2013.01); *F28F 9/02*
  (2013.01); *B23K 2201/14* (2013.01); *F28D*
  *9/0062* (2013.01); *F28F 2275/06* (2013.01)
(58) Field of Classification Search
  USPC .................. 165/157, 149, 173, 175, 178
  See application file for complete search history.

(56) References Cited

U.S. PATENT DOCUMENTS

| | | | | |
|---|---|---|---|---|
| 4,624,379 | A | * | 11/1986 | Rothenbucher ........... F28F 9/02 220/4.01 |
| 2001/0017200 | A1 | * | 8/2001 | Noishiki ............... F28D 9/0062 165/149 |
| 2002/0015857 | A1 | | 2/2002 | Noishiki et al. |
| 2012/0118544 | A1 | * | 5/2012 | Ciaffarafa ............. F28F 9/0219 165/157 |
| 2015/0122455 | A1 | * | 5/2015 | Fox ....................... F28F 21/084 165/67 |

FOREIGN PATENT DOCUMENTS

| | | | | |
|---|---|---|---|---|
| JP | S54-78722 | U | | 6/1979 |
| JP | 63104888 | A | * | 5/1988 |
| JP | S63-104888 | U | | 7/1988 |
| JP | 2001-030091 | A | | 2/2001 |
| JP | 2002-011573 | A | | 1/2002 |
| JP | 2009-208651 | A | | 9/2009 |
| JP | 2009208651 | A | * | 9/2009 |
| JP | 2009-222306 | A | | 10/2009 |
| JP | 2012-210653 | A | | 11/2012 |

\* cited by examiner

HEAT EXCHANGER

TECHNICAL FIELD

The technique disclosed herein relates to a heat exchanger, and more particularly relates to a welding structure of a header tank to a core.

BACKGROUND ART

For example, as disclosed in Patent Document 1, a plate-fin heat exchanger is structured such that an independently formed header tank is joined, by welding, to a core formed by stacking a multitude of plates on each other and integrating them together. Specifically, the entire peripheral edge of the opening of the header tank is provided with a bevel inclined from the internal surface of the header tank toward the external surface thereof at a predetermined bevel angle (groove angle), and is welded from the outside of the header tank.

CITATION LIST

Patent Document

PATENT DOCUMENT 1: Japanese Unexamined Patent Publication No. 2002-11573

SUMMARY OF THE INVENTION

Technical Problem

Large heat exchangers, high-pressure heat exchangers, or high-temperature heat exchangers have a header tank with a greater thickness to ensure its strength. The greater the thickness is, the larger a weld bead is. The increase in the size of the weld bead described here means an increase in the cross-sectional area of the weld bead of bevel welding (bevel groove welding) in the transverse cross-section of the welded joint where the edge of the opening of the header tank is disposed substantially perpendicular to the joined surface of the core. For example, as illustrated in FIG. 3, if the thickness t of a header tank 3 is increased, the width of a bevel 34 inclined from the internal surface of the header tank 3 toward the external surface thereof at a predetermined bevel angle $\theta 1$ increases in the thickness direction of the header tank, thereby causing an increase in the cross-sectional area of a weld bead 36.

If the size of the weld bead 36 is increased, heat input to the core 2 also increases due to an increase in the time for welding. As a result, as exemplified in dot-dash line in FIG. 3, a heat-affected area in the core 2 expands, and the temperature of the welded joint and the temperature of the vicinity thereof may further increase. In order to address such an effect of heat input, the known art sometimes takes some countermeasures for the core. However, there is a demand for saving the need for taking such countermeasures.

In view of the foregoing, it is therefore an object of the technique disclosed herein to, in a heat exchanger having a structure where a header tank is joined by welding to a core, save the need for taking countermeasures for the core against a heat problem of the core in welding.

Solution To The Problem

The present inventors focused on the fact that attachment of a nozzle causes a further increase in the thickness of a header tank. Specifically, a through hole is provided in a nozzle attachment portion of the header tank. If no through hole is provided, a thickness t1 is a thickness of the header tank that can provide the necessary strength. However, providing the through hole reduces the material of the header tank, and the header tank needs to have a greater thickness than the thickness t1 to compensate for such a reduced material. Only the nozzle attachment portion and its vicinity need such a greater thickness, and the edge of the opening of the header tank welded to the core and its vicinity may have the thickness t1. The present inventors provide the edge of the opening of the header tank with a second inclined portion inclined from the external surface of the header tank toward the internal surface thereof to reduce the width of the bevel in the thickness direction of the header tank. This reduces the size of the weld bead for welding the header tank to the core, and heat input to the core during the welding.

Specifically, the technique disclosed herein relates to a heat exchanger including a core, and a header tank having an opening, the entire peripheral edge of the opening being welded to the core. The entire peripheral edge of the opening of the header tank has a bevel inclined from an internal surface of the header tank toward an external surface thereof at a predetermined bevel angle. At least a portion of the peripheral edge of the opening of the header tank has a second inclined portion inclined from the external surface of the header tank toward the internal surface thereof at an angle larger than the predetermined bevel angle.

According to this configuration, the entire peripheral edge of the opening of the header tank welded to the core has the bevel for welding. The bevel is provided so as to be inclined from the internal surface of the header tank at a predetermined bevel angle.

According to the above configuration, at least a portion of the peripheral edge of the opening of the header tank has the second inclined portion inclined from the external surface of the header tank toward the internal surface thereof at an angle larger than the predetermined bevel angle. The second inclined portion may be provided to be continuous, or may not be provided to be continuous with the bevel. The header tank is welded to the core by welding the bevel to the core. The width of the bevel in the thickness direction of the header tank is reduced at a portion where the second inclined portion is formed, which leads to a reduction in size of the weld bead, and hence heat input to the core during the welding. This thus reduces the size of the weld bead, and heat input to the core during the welding. This reduces the area of the core affected by heat, and the temperature rise in the core, compared with a case where no second inclined portion is formed. As a result, it is unnecessary to take countermeasures against a heat problem of the core in welding.

The second inclined portion has a relatively large inclined angle. This reduces the reduction rate of the thickness of the header tank, which is advantageous for ensuring its strength. Needless to say, the bevel where the second inclined portion is provided should have a required thickness.

Specifically, it is preferable that the header tank has a thickness that includes, in addition to a first thickness that is set to ensure necessary strength of the header tank, a second thickness that is set to reinforce the header tank provided with a passage hole through which a fluid passes in the header tank, and the second inclined portion is formed by reducing the thickness of the header tank from the thickness that is the sum of the first and second thicknesses to the first thickness.

The first thickness may be appropriately set to be not less than the minimum thickness enough to be resistant to the tank internal pressure and/or external pressure under a condition where no passage hole is formed.

In this manner, the bevel has the first thickness necessary to be resistant to the tank internal pressure and/or the external pressure. This allows for reducing the size of the weld bead while ensuring necessary strength of the header tank.

The second inclined portion may be provided in the entire peripheral edge of the opening of the header tank.

The second inclined portion may be provided only at a portion of the edge of the opening of the header tank where the heat effect on the core is particularly desired to be reduced. This makes it possible to save time and effort in forming the second inclined portion.

The core may be a plate-fin core formed by stacking a plurality of plates on each other and brazing the plates together.

As described above, providing the second inclined portion in at least the portion of the edge of the opening of the header tank reduces heat input during the welding to the plate-fin core formed by brazing. This saves the need for countermeasures for the core against a heat problem of the core in welding.

Advantages of the Invention

As can be seen from the foregoing description, according to the above heat exchanger, providing the second inclined portion inclined from the external surface of the header tank toward the internal surface thereof in at least a portion of the edge of the opening of the header tank reduces the width of the bevel in the thickness direction, the size of the weld bead, and heat input during the welding. This can reduce an area of the core affected by heat, and the temperature rise, and saves the need for taking countermeasures against a heat problem of the core in welding.

DESCRIPTION OF EMBODIMENTS

Figure 1:
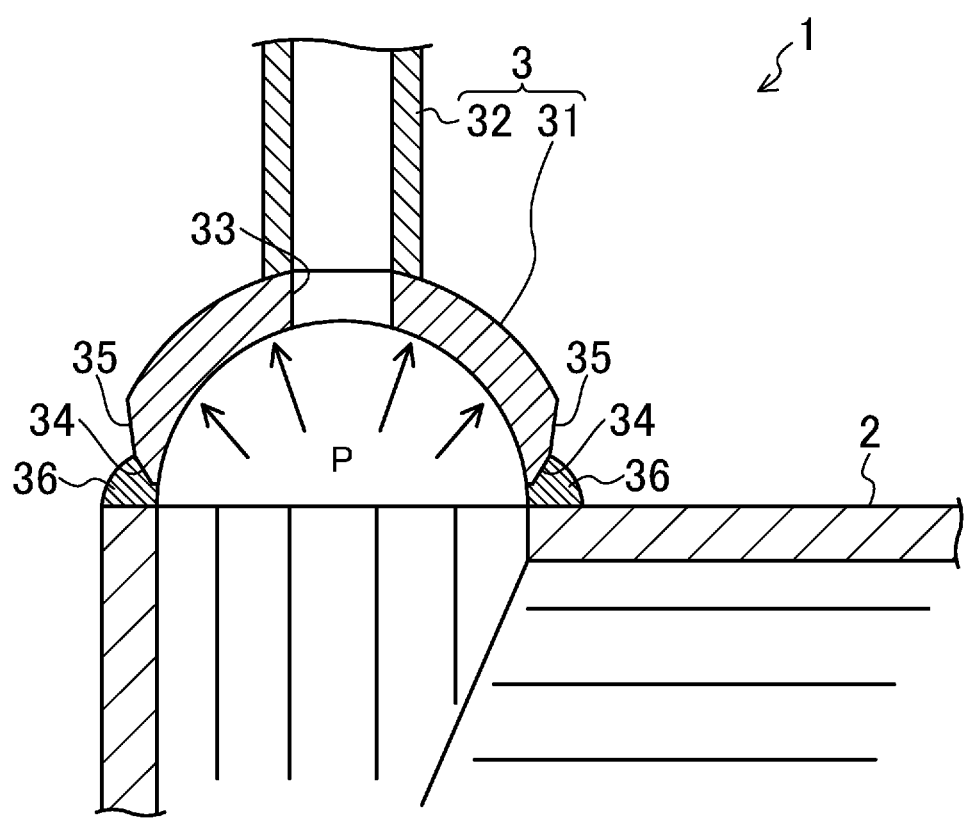
FIG. 1 is a cross sectional view conceptually illustrating a portion of a heat exchanger to which a header tank is joined.

An embodiment of a heat exchanger 1 will now be described with reference to the drawings. The following preferred embodiment will be described merely as an example. FIG. 1 is a view conceptually illustrating a portion of the heat exchanger 1 to which a header tank 3 is joined. The heat exchanger 1 includes a core 2 exchanging heat between a first fluid and a second fluid, and the header tank 3 allowing the first or second fluid to flow in or out of the core 2. FIG. 1 illustrates only a specific header tank 3. The heat exchanger 1 also includes at least one more header tank in addition to the illustrated header tank 3. The technique disclosed herein is also applicable to a core through which three or more types of fluids flow.

The core 2, not specifically illustrated, is formed as an alternate stack of a first channel through which the first fluid flows and a second channel through which the second fluid flows by defining the first channel and the second channel by tube plates serving as a primary heat transfer surface. A corrugated fin serving as an enlarged heat transfer surface may be provided in the first and/or the second channels. Such a core 2 is formed by, e.g., stacking tube plates on each other and integrating them together by brazing. That is, the core 2 may be a plate-fin core.

The header tank 3 is joined to the inlet or outlet of the first or second channel in the core 2. The header tank 3 disperses the first or second fluid to allow the fluid to flow into the core 2, or collects the first or second fluid that has flowed out of the core 2 to discharge the fluid. The header tank 3 is comprised of a semi-cylindrical body 31 lower part of which is open, and a nozzle 32 attached to the body 31, as exemplified in FIG. 4. The body 31 is provided with a through hole 33 at a portion of the body 31, to which the nozzle 32 is attached, for communicating with the nozzle 32. The header tank 3 is joined to the core 2 by welding the entire peripheral edge of the opening of the header tank 3 from the outside thereof. This welding structure will be described in detail later.

Figure 2:
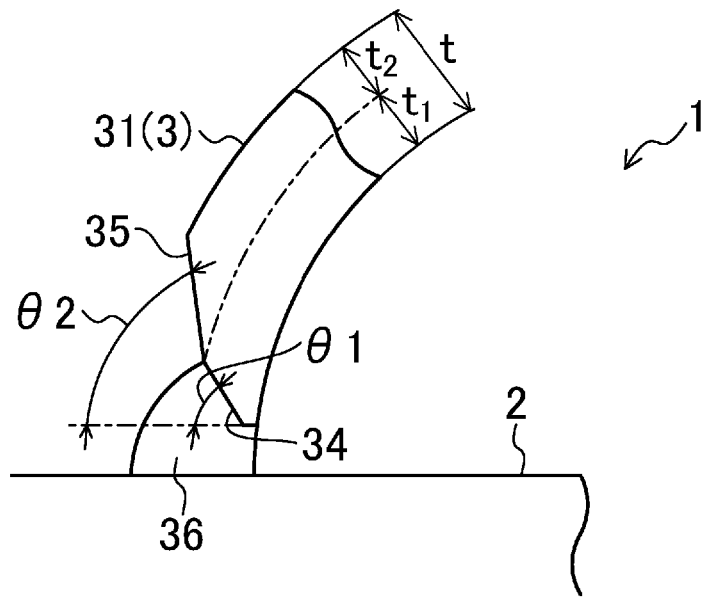
FIG. 2 is an enlarged cross-sectional view of a welded joint of the header tank.

As illustrated in FIGS. 1 and 2, the thickness t of the header tank 3 is set as a sum of a first thickness t1 and a second thickness t2, the first thickness t1 being set enough to be resistant to, e.g., an internal pressure P and/or external pressure if no through hole 33 communicating with the nozzle 32 is formed, and the second thickness t2 being set to compensate for the reduction in strength of the nozzle 32 and its vicinity due to formation of the through hole 33. The first thickness t1 is appropriately set to be not less than the minimum thickness enough to be resistant to the tank internal pressure and/or external pressure. The header tank 3 has a uniform thickness in view of formability. The portion of the header tank 3 to which the nozzle 32 is attached needs a thickness of t1+t2=t, whereas the edge of the opening of the header tank 3 welded to the core 2 is sufficiently strong enough to resistant to, e.g., the internal pressure if it has the thickness t1.

In this heat exchanger 1, the edge of the opening of the header tank 3 where welding is performed is provided not only with a bevel 34 necessary for the welding, but also with a second inclined portion 35 continuous with the bevel 34. This reduces the width of the bevel 34 in the thickness direction of the header tank 3.

Figure 5A:
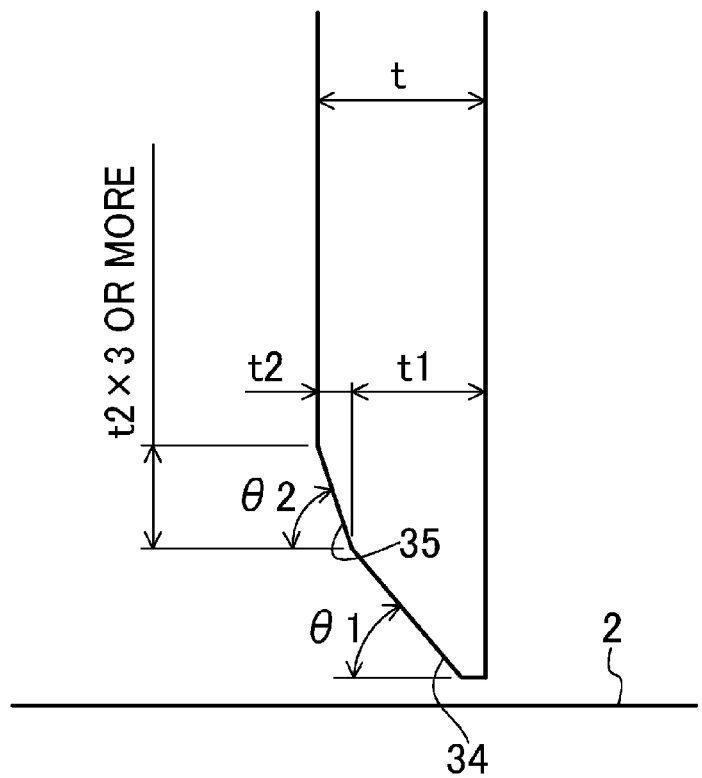
FIG. 5A is a conceptual diagram illustrating a preferable angle as an inclined angle of a second inclined portion.

Specifically, as illustrated in FIG. 2, the entire peripheral edge of the opening of the header tank 3 is provided with the bevel 34 inclined from the internal surface of the header tank 3 toward the external surface thereof at a predetermined bevel angle θ1. This bevel angle θ1 can be set in an appropriate range according to, e.g., welding conditions. The second inclined portion 35 is provided to be continuous with the thus formed bevel 34. The second inclined portion 35 is set to have an angle θ2 larger than the angle θ1 of the bevel, and is continuous to the external surface of the header tank 3. Providing the second inclined portion 35 is equivalent to reducing the thickness of the header tank 3 from t to t1. The second inclined portion 35 is thus preferably set to have the bevel angle θ2 that does not cause a significant change in the thickness. For example, as conceptually shown in FIG. 5A, the second inclined portion 35 is preferably inclined at the angle θ2 to have a length of t2×3 or more where t2 is a reduced thickness.

Figure 3:
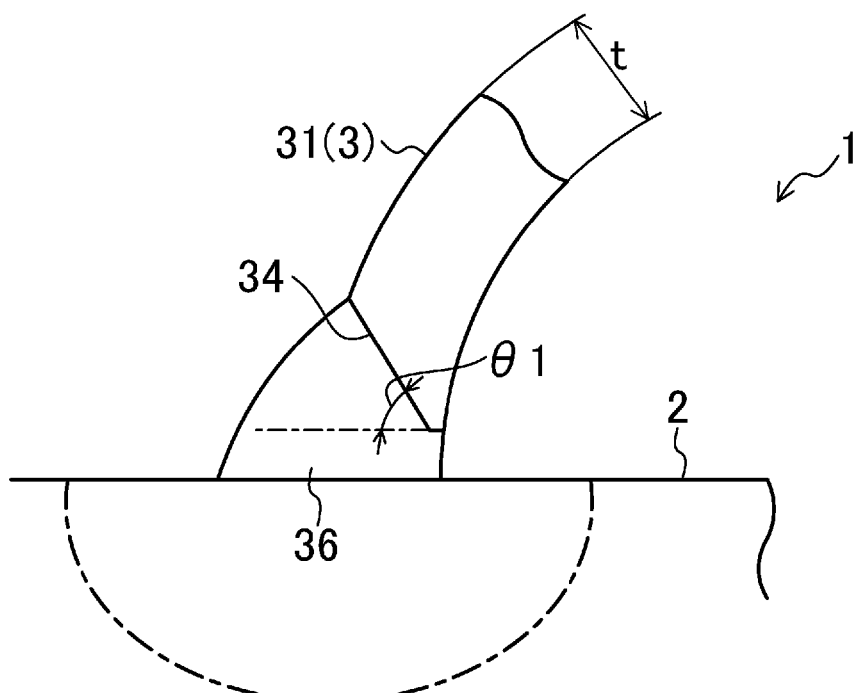
FIG. 3 is a view corresponding to FIG. 2, and illustrating a conventional structure of a welded joint.

The thus formed second inclined portion 35 causes a reduction in the width of the bevel 34 in the thickness direction of the header tank 3. As illustrated in FIG. 2, in the welding of the header tank 3, only the bevel of the header tank 3 is welded to the core 2 from the outside of the header tank 3 with the edge of the opening of the header tank 3 disposed substantially orthogonal to the surface of the core 2 (backing metal, which is not illustrated in FIG. 2, may be provided in the welded joint of the header tank 3). A reduction in the width of the bevel 34 in the thickness direction of the header tank 3 thus causes a reduction in the size of the weld bead 36. FIG. 3 illustrates the structure of welding in a case where the bevel 34 is provided from the internal surface of the header tank 3 to the external surface thereof without the second inclined portion 35. The thickness t of the header tank 3 in FIG. 2 is the same as that in FIG. 3, and the angle θ1 of the bevel 34 in FIG. 2 is also the same as that in FIG. 3. As is clear in FIG. 3, if the thickness t of the header tank 3 is increased, the width of the bevel 34 increases in the thickness direction of the header tank 3, which leads to an increase in the size of the weld bead 36, and hence to an increase in heat input during the welding. As a result, as exemplified in dot-dash line in FIG. 3, a heat-affected area in the core 2 expands, and its temperature also rises significantly.

In contrast, in the welding structure illustrated in FIG. 2, providing the second inclined portion 35 causes a reduction in the size of the weld bead 36 and a reduction in heat input during the welding. This reduces the heat-affected area in the core 2, and the temperature rise in the core 2. This makes it possible to save the need for countermeasures for the core 2 against a heat problem of the core 2. Moreover, the thickness t1 of the header tank 3 is ensured at the bevel 34, thereby allowing the header tank 3 to have sufficient strength.

Providing the second inclined portion 35 in the header tank 3 to reduce the size of weld bead 36 also advantageously reduces the overlap width of the core 2 for welding with the header tank 3. This makes it possible to ensure desired weld strength even if the overlap width of the core 2 for welding with the header tank 3 cannot be sufficiently ensured. That is because the header tank 3 is joined to the edge of the core 2, as exemplified in FIG. 1.

Figure 4:
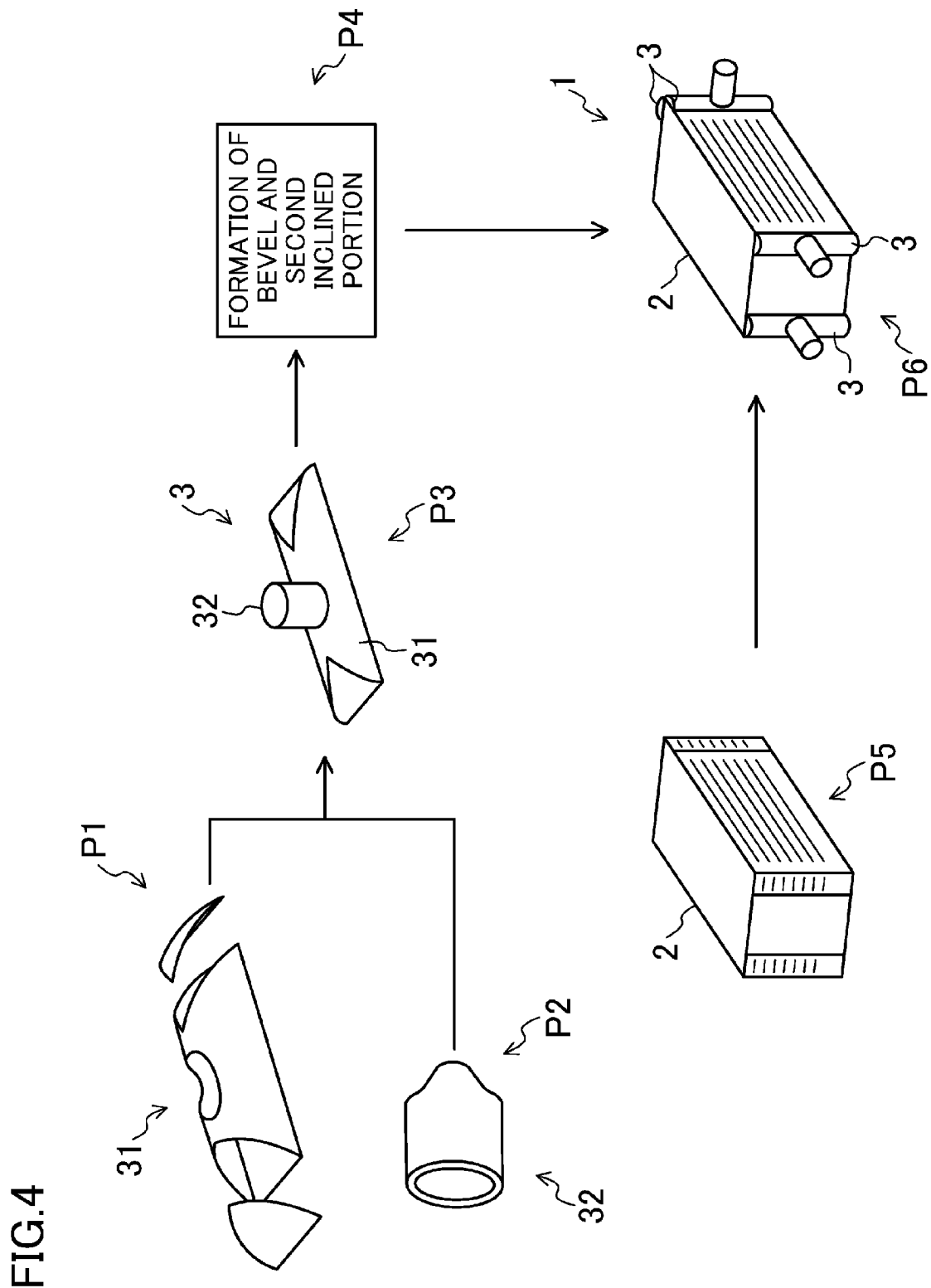
FIG. 4 is an illustration for explaining the manufacturing procedure of the heat exchanger.

A manufacturing procedure of the heat exchanger 1 will now be described with reference to FIG. 4. First, in Step P1, a plate is, e.g., bent to have a predetermined shape, and respective components are welded together, thereby forming a body 31 of the header tank 3. In Step P2, a tube material is processed and formed to have a predetermined shape, thereby forming the nozzle 32 of the header tank 3. Then, in Step P3, the obtained body 31 and the nozzle 32 are joined together by welding to obtain the header tank 3. The edge of the opening of the header tank 3 formed in this manner is beveled and is provided with the second inclined portion 35, although not illustrated in the drawing (Step P4). The second inclined portion 35 may be provided only at a portion of the core 2 where the heat effect is desired to be reduced, instead of being provided at the entire peripheral edge of the opening of the header tank 3. In the rectangular-shaped edge, formed by four sides, of the opening of the header tank 3, the second inclined portion 35 may be provided to only the edge of a specific side of the four sides, for example. The bevel 34 and the second inclined portion 35 are linearly formed along the edge of the opening of the header tank 3, and thus can be relatively easily formed.

On the other hand, although not specifically illustrated in the drawing, in Step P5, tube plates, etc., that have been cut into a predetermined shape are stacked on each other and brazed together, thereby obtaining the core 2.

The header tank 3 is welded to a predetermined portion of the thus obtained core 2, thereby obtaining the heat exchanger 1 (See Step P6).

In this manner, the heat exchanger 1 described above reduces as much heat input to the core 2 as possible during the welding of the header tank 3. The configuration of such a heat exchanger 1 is particularly useful for heat exchangers such as large heat exchangers, high-pressure heat exchangers, or high-temperature heat exchangers in which a header tank 3 has a greater thickness.

Figure 5B:
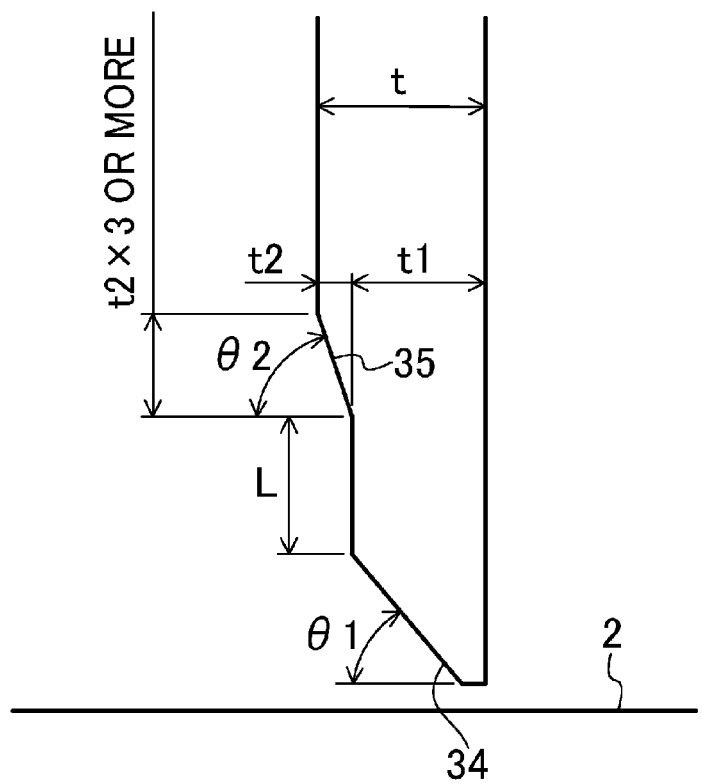
FIG. 5B is a conceptual diagram illustrating a preferable inclined angle of a second inclined portion if a bevel and the second inclined portion are not continuous.

In the above example, the second inclined portion 35 is provided to be continuous with the bevel 34. Alternatively, the second inclined portion 35 may not be provided to be continuous with the bevel 34 as conceptually illustrated in FIG. 5B. In this case, the second inclined portion 35 is set to have a bevel angle θ2 in the same manner as in the above embodiment. The interval L between the bevel 34 and the second inclined portion 35 can be set as appropriate.

Instead of the above-described plate-fin core 2 formed by brazing, e.g., tube plates together, another core having a different configuration may be adopted.

INDUSTRIAL APPLICABILITY

As can be seen from the foregoing description, the heat exchanger disclosed herein is particularly useful as large heat exchangers, high-pressure heat exchangers, or high-temperature heat exchangers in which a header tank may have a greater thickness.

DESCRIPTION OF REFERENCE CHARACTERS 1 heat exchanger
2 core
3 header tank
34 bevel
35 second inclined portion
t1 first thickness
t2 second thickness
θ1 bevel angle
θ2 angle of second inclined portion

The invention claimed is:
1. A heat exchanger, comprising:
a core; and
a header tank having an opening, an entire peripheral edge of the opening being welded to the core, wherein
the entire peripheral edge of the opening of the header tank has a bevel inclined from an internal surface of the header tank toward an external surface thereof at a predetermined bevel angle, and at least a portion of the peripheral edge of the opening of the header tank has a second inclined portion inclined from the external surface of the header tank toward the internal surface thereof at an angle larger than the predetermined bevel angle such that a thickness of the header tank is reduced to a predetermined thickness, and
only the bevel is welded.
2. The heat exchanger of claim 1, wherein
the core is a plate-fin core formed by stacking a plurality of plates on each other and brazing the plates together.
3. The heat exchanger of claim 1, wherein
the second inclined portion is provided in the entire peripheral edge of the opening of the header tank.

4. The heat exchanger of claim 2, wherein the second inclined portion is provided in the entire peripheral edge of the opening of the header tank.

\* \* \* \* \*